April 25, 1933.    C. A. B. WATSON    1,905,956

EXPOSURE INDICATOR ATTACHMENT TO PHOTOGRAPHIC CAMERAS

Filed June 15, 1931    2 Sheets-Sheet 1

Inventor
C. A. B. Watson,
by his Attorney

April 25, 1933. C. A. B. WATSON 1,905,956
EXPOSURE INDICATOR ATTACHMENT TO PHOTOGRAPHIC CAMERAS
Filed June 15, 1931 2 Sheets-Sheet 2

Inventor:
Cecil Alexander Burns Watson
By
Attorney.

Patented Apr. 25, 1933

1,905,956

UNITED STATES PATENT OFFICE

CECIL ALEXANDER BURNS WATSON, OF AUCKLAND, NEW ZEALAND

EXPOSURE INDICATOR ATTACHMENT TO PHOTOGRAPHIC CAMERAS

Application filed June 15, 1931, Serial No. 544,589, and in New Zealand February 6, 1931.

This invention has been devised in order to provide means for attachment to a photographic camera whereby an indication is given upon each operation of the exposure mechanism to make an exposure, to show that such exposure has been made.

The invention is more particularly adapted for use upon a camera of any of the known types employing for exposure purposes roll films, the sections of which are fed one by one through the exposure position by the feeding of the film length from one roller spool to another in the well known method.

While these sections of film are consecutively numbered and their numbers are exposed through a sight window in the camera body and thus serve to give an indication as to the number of the section in exposure position, no definite indication is given that such section has been used for exposure purposes. Consequently doubts are apt to arise in the user's mind as to whether an exposure on a particular section has been made or not, with the result that in many cases a second exposure is made upon the same section, or if steps are taken to ensure an unexposed section by feeding a new section into position, the previous section if not used, is wasted.

The attachments forming the present invention are designed to provide for a special indicator being automaticaly actuated by the operation of the shutter mechanism to make an exposure, each time an exposure is made, and for such indicator to exhibit to view a number corresponding to the number of the exposed film section. Then, at any time, by a comparison of such number with the film section number also exposed to view, an operator may check up the exposures and definitely ascertain if the section in position has been used or not.

These means are adaptable for incorporation in cameras having the well known Iris exposure shutters or for the well known forms of box cameras having disc exposure shutters that move reciprocably on a central axis in the making of an exposure. They are also of such a nature as to provide that a single actuation of the indicator only is made, whether the shutter operating trigger is actuated once, as with "instantaneous" exposure, or twice as with "time" exposure operations, in the well known way characteristic of these cameras.

In fully describing the invention, reference will be made to the accompanying sheet of drawings, in which:—

Figure 1:
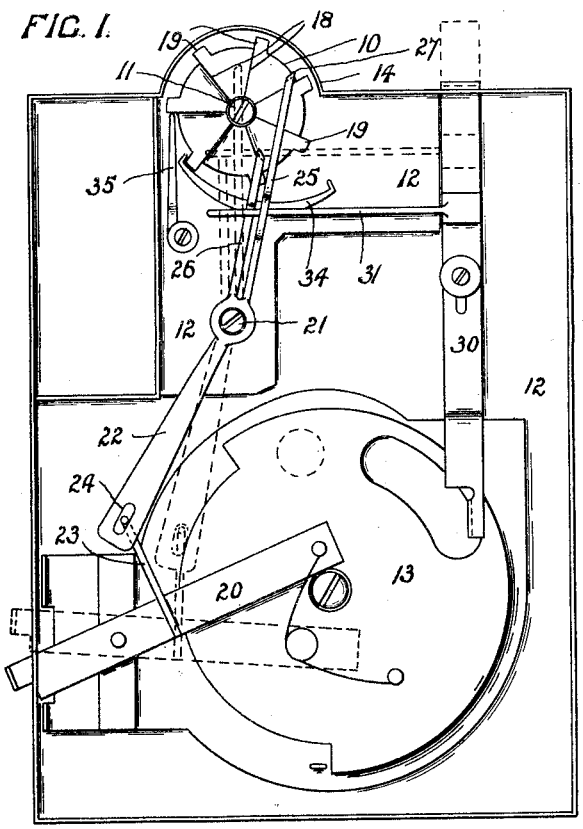
Figure 1 is an elevation of the front of a well known box type of camera with the lens carrying front plate removed, and showing the exposure shutter and its actuating means and also the special exposure indicator and the means for actuating it.
Figure 3:
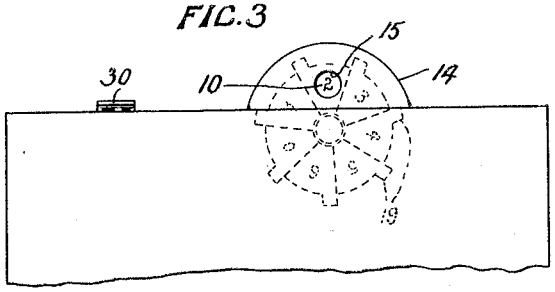
Figure 3 is a rear view of the top of the camera box showing the indicator as viewed by the operator.
Figure 4:
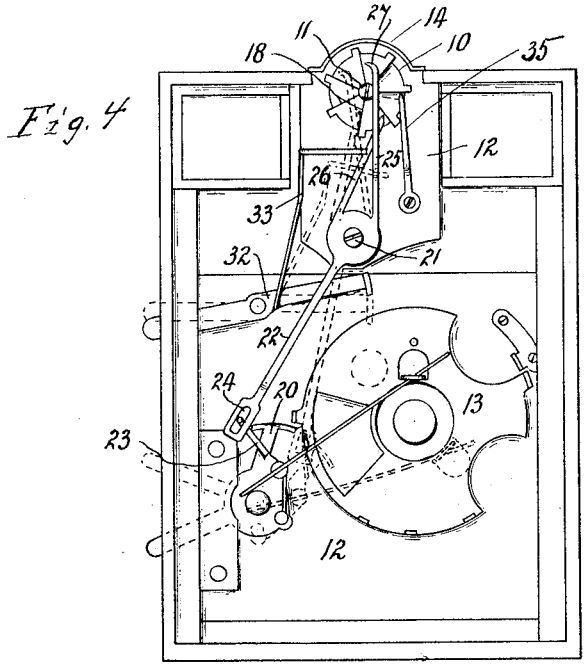
Figure 4 is a similar view to Figure 1 but showing the adaptation of the indicator mechanism to another well known form of box camera.

The essenial feature of the invention, in each of its applications, comprises the use of a circular disc 10 that is mounted to rotate upon a central pin 11 fixed at a convenient point within the casing of the camera so that a portion of the disc's surface passes across a vision aperture in such casing exposing it to view from the outside. In each of the box cameras, shown in Figures 1 and 4 the disc is mounted against the face 12 of the camera box front, upon which also the shutter 13 and its actuating gear are mounted. The box casing is however formed with an upward projection 14 that encloses the upper portion of the disc and in the back of this projection a small aperture 15 (Figures 2 and 3) is made, across which a portion of the disc 10 will pass so that it may be viewed through the aperture. In the instance shown in Figure 5 the disc 10 is mounted upon the front face of the back of the shutter casing 16 which is extended, as at 17, to accommodate it and its mechanism without interference with the shutter and its mechanism. In this instance a portion of the disc's rear face also passes across an aperture made in the said casing back so that it may be viewed through the aperture.

The disc is divided into a number of radial divisions exceeding by one the number of sections in the film with which the indicator is designed to be used. Thus where the film has six exposure sections, the disc has seven divisions. Each of these is numbered on the back of the disc with numbers extending from 0 to 6, the numbers being arranged in a ring concentric with the centre and coincident with the aperture 15 in order that as each number comes opposite the aperture it may be viewed. On its front face the disc's divisions are represented by radial ratchet teeth 18 projecting from its face while its peripheral edge may also have seven evenly spaced teeth 19 formed thereon.

The disc is designed to be actuated to turn it through a proportion of its full rotation represented by the number of its divisions, in the present case one seventh, on each exposure operation of the exposure shutter. Thus if it is turned so that the numeral 0 is exposed to view when the film is disposed with its No. 1 section in exposure position, the operation of the camera to make that exposure will move the disc round to cause the numeral 1 to be viewed, thereby indicating that such film section has been exposed and warning the operator that the film must be fed to bring another section into position before another exposure is made. Then on the second exposure being made the disc numeral 2 is brought into view, and so on, for the whole six exposures in turn each one as it is exposed, having its corresponding number exposed by the operations of the disc.

The disc 10 is designed to be moved through its proportion of rotation through mechanism actuated by the shutter actuating lever 20. This mechanism as provided in the forms of cameras shown in the drawings differs in each case from the others in its detail features but is the same in its general principles. In each of the instances of the box cameras shown in Figures 1 and 4 it comprises a bell crank lever that is pivoted to the box face 12, at 21, so that it may move to and fro across such face. One arm 22 of this bell crank extends downwards and is connected to the shutter actuating lever 20 by an arm 23 affixed to such lever and at its end engaging a slot 24 in the said arm 22 so that as the shutter lever is moved up and down in its usual shutter actuating movements it will impart a transverse movement to the bell crank in reverse directions, being moved in one direction as the shutter lever 20 is moved down and in the other when it is moved up. This provides that in "instantaneous" exposure work in which a single movement up or down is imparted to the lever 20, the arm 22 is moved once, but in "time" exposure work where a double movement is imparted to the lever 20, either up and down, or down and up, the arm 22 is moved twice, i. e. once in each direction.

The upper arm of the bell crank lever is made up of two members 25 and 26 which are separate one from the other and extend to overlap the face of the disc 10. The arms are however of different lengths, one extending to overlap the disc on the lower side of its pivot, and the other to extend to the upper side. These arms are of springy nature and are made to bear in so that their extremities engage the surface of the disc. Each extremity is also formed with a tooth 27 projecting inwardly which is adapted to engage the ratchet teeth 18 of the disc and pull the disc round when the arm is moved across in one direction and to slide freely over such teeth when moved across in the other direction. By reason of the fact that these teeth 27 are positioned on opposite sides of the disc's pivot, a movement of the bell crank in either direction will cause one tooth to engage the ratchet to impart rotation to the disc, and the other to move freely over it. Both movements of the bell crank will therefore impart rotation to the disc in the same direction when both teeth 27 are allowed to contact with the disc, and thus to provide for a movement of the disc on each operation of the shutter lever 20 as in "instantaneous" exposure operation.

Figure 2:
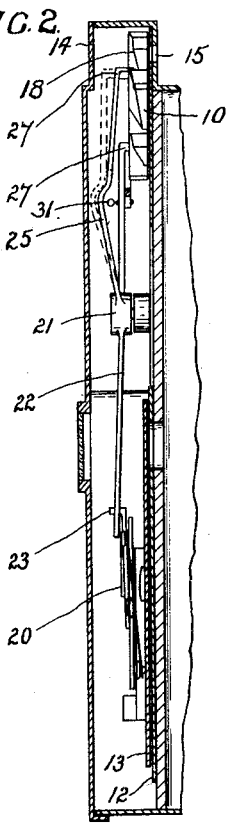
Figure 2 is a sectional side elevation thereof taken on an irregular vertical line through Figure 1.

Provision is, however, made whereby the disc shall be rotated by only one of the bell crank's and shutter lever's movements as such are moved twice in "time" exposure operation of the camera. Means for this purpose are designed to lift one of the arms 25 or 26 out of engagement with the disc when the shutter control device changing from "instantaneous" to "time" exposure is actuated in the manner to make such change, and to free it to re-engage when the change is made back again. In the form of camera shown in Figures 1 and 2 this device consists in the sliding detent bar 30 acting in the well known way to move longitudinally vertically and it has attached to it a rod 31 that extends laterally and passes in beneath the arm 25 and between it and the arm 26. The arm 25 is curved outwardly and then inwardly, as shown in Figure 2, to allow for this and for it being engaged by the rod 31 when the bar 30 is lifted and thereby to be forced outward from the disc 10, as indicated by the dotted lines. In this case the arm 25 then slides idly to and fro along the rod in the movements of the bell crank, while the arm 26 moves reciprocally on the disc its movement in one direction being an idle one and its movement in the other imparting turning movement to the disc. In the form of camera shown in Figure 4 the shutter control device consists in the detent lever 32 pivoted to swing on the camera face 12, also in a well known way. In this case the inner end of this lever has a rod 33 affixed to it which extends up and then laterally to pass in between the two arms 25 and 26 so that when the lever 32 is moved to effect the change from "instantaneous" to "time" exposure the rod end moves down and in beneath the arm 25 and lifts it away from engagement with the disc and the arm then slides idly to and fro on this rod in the same manner as in the previous instance. When the lever 32 is moved reversely the arm 25 is freed to move into its engagement with the disc.

The throw in each direction of the bell crank lever 22—25 and 26 through the operations of the shutter lever 20, is adjusted to cause the disc 10 to be turned through a distance equal to one of its divisions but in order to prevent any over-run, one of the arms 26 (Figure 1) may have combined with it, an escapement bow 34 which engages the teeth 19 upon the disc's periphery. This is adjusted to accurately gauge the amount of turning. To prevent any reverse movement of the disc, a spring detent tooth 35 is fastened to the box face 12 and engages either the teeth 19 or the ratchet teeth 18 of the disc as they pass beneath it.

Figure 5:
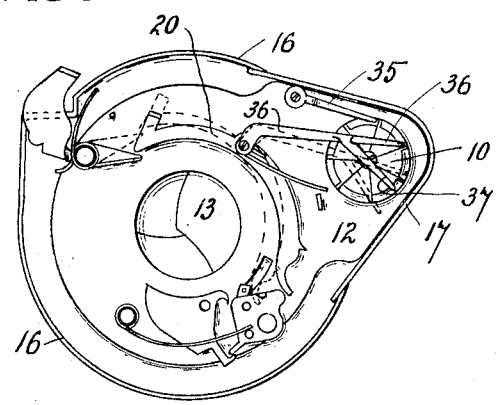
Figure 5 is an inside view of an Iris diaphragm shutter and lens casing, showing the indicator fitted therein and the shutter actuating means that combine therewith.

In the form of camera shown in Figure 5 the shutter actuating lever 20 in an "instantaneous" exposure moves through a full distance downward and upward, and in a "time" exposure moves through a full distance down, to open the shutter, then moves back only a partial distance while the shutter remains open and then is moved down again to close the shutter and returns to its normal upward position, in a manner well known in camera construction and operation. The means for actuating the disc 10 in this case therefore are designed to impart a turning movement only upon the said full downward movement of the shutter lever and thereby to cause only one movement whether it be an "instantaneous" or "time" exposure that is made. They comprise the combination with the usual shutter lever 20, of a spring arm tooth 36 that is fixed thereto and extends across the ratchet face of the disc 10 so as to engage such face and as the lever 20 is moved down in the manner described, will engage a tooth of the ratchet and move the disc round a distance equivalent to one of its divisions, and then on the return of the shutter lever to its normal position will slide back to engage the next ratchet tooth. Any undue rebound of this spring tooth brought about through the usual spring rebound of the shutter lever, may be taken up by a second tooth 37 affixed to the tooth 36 which engages the peripheral edge of the disc when the spring tooth moves back far enough to engage the next ratchet tooth, and prevents any further movement. This tooth 37 moves out of the way of the disc when the disc is being turned. In this instance also a spring detent 35 is provided to hold the disc against reverse rotation.

In "time" exposure operations in this instance, the upward movement of the shutter lever, after the shutter has been opened, is not sufficient to allow for the tooth 36 engaging the next tooth in the disc ratchet. Consequently as it is moved down again in the operation of closing the shutter it moves idly on the disc and only returns to its next engagement position when the shutter lever moves to its normal top position. Thus only one operation of the disc takes place with either a "time" or "instantaneous" exposure, in this case also.

It will therefore be seen that the disc 10 is actuated to cause a fresh member to be exposed through the sight aperture 15 on each occasion an exposure is made and through the operation of the shutter operating lever of the camera.

An important feature in the invention is concerned with the manner in which the disc 10 is mounted as described in an extension of the casing provided to receive it and so formed as to exhibit the disc numbers rearwardly, as by this arrangement the indicator may be readily seen by the operator when the camera is held in the position to make an exposure and also in the position at which the film numbers are inspected. A comparsion of the two exposed numbers may therefore be made without trouble and without having to turn the camera round.

I claim :—

1. In cameras, a casing having an extension projecting therefrom formed with a vision aperture in its rear side, a round disc mounted in the casing to rotate upon a central axis and disposed to extend into the said extension so that a portion of its rear face is positioned against the said vision aperture, which rear face is numbered with characters disposed in a ring coincident with the aperture and spaced at even distances apart, and the front face of which disc is formed with radial teeth corresponding in number and spacing with the spacing of the said characters, shutter actuating means for the camera and means combining therewith and with the said disc, whereby on each complete exposure operation of the shutter, the disc is caused to turn on its axis through a distance corresponding to the spaces between the characters thereon.

2. In cameras, a casing made with a vision aperture, exposure shutter operating means within the camera comprising a reciprocating lever, a disc mounted within the casing upon a central axis and disposed with one face to expose a portion thereof through the aperture, which face is numbered with characters disposed in a ring coincident with the aperture and at even distances apart, and which disc is formed on its other face with radial ratchet teeth corresponding in number and spacing with the spacing of the said characters thereon, and a bell crank lever disposed in the camera casing to move in a parallel plane with the said disc, one arm of which is linked to the said shutter actuating lever so that the to and fro movements thereof impart transverse rocking movements to the bell crank lever, and the other arm of which is formed by two spring tooth members which engage the disc ratchet respectively on opposite sides of the disc center.

3. In cameras having the means covered by claim 2 and having also shutter controlling mechanism to change from "instantaneous" to "time" exposure and back again, the combination with the said ratchet toothed disc and with the said exposure shutter actuating lever, of a bell crank lever disposed in the camera casing to move in a parallel plane with the said disc, one arm of which is linked to the said shutter actuating lever so that the to and fro movements thereof impart transverse rocking movements to the bell crank lever, and the other arm of which is formed by two spring tooth members which engage the disc ratchet respectively on opposite sides of the disc center, and means attached to the said shutter controlling mechanism whereby on the change being made from "instantaneous" to "time" exposure one of the said spring tooth members is lifted away from engagement with the said disc, such means embodying a rod that is moved beneath the tooth member to force it outward from the disc when the said mechanism is actuated.

4. In cameras having the means covered by claim 2 and having also shutter controlling mechanism to change from "instantaneous" to "time" exposure and back again, the combination with the said ratchet toothed disc and with the said exposure shutter actuating lever, of a bell crank lecer disposed in the camera casing to move in a parallel plane with the said disc, one arm of which is linked to the said shutter actuating lever so that the to and fro movements thereof impart transverse rocking movements to the bell crank lever, and the other arm of which is formed by two spring tooth members which engage the disc ratchet respectively on opposite sides of the disc center, means attached to the said shutter controlling mechanism whereby on the change being made from "instantaneous" to "time" exposure one of the said spring tooth members is lifted away from engagement with the said disc, such means embodying a rod that is moved beneath the tooth member to force it outward from the disc when the said mechanism is actuated, an escapement combined with the said pawl tooth and engaging the teeth upon the said disc, and a spring detent attached to the camera casing and engaging the said teeth and arranged to prevent any reverse rotation of the disc.

In testimony whereof, I affix my signature.
CECIL ALEXANDER BURNS WATSON.